May 10, 1949. E. M. SQUIRE Re. 23,112
COIN-OPERATED VOICE RECORDING MACHINE
Original Filed March 9, 1942
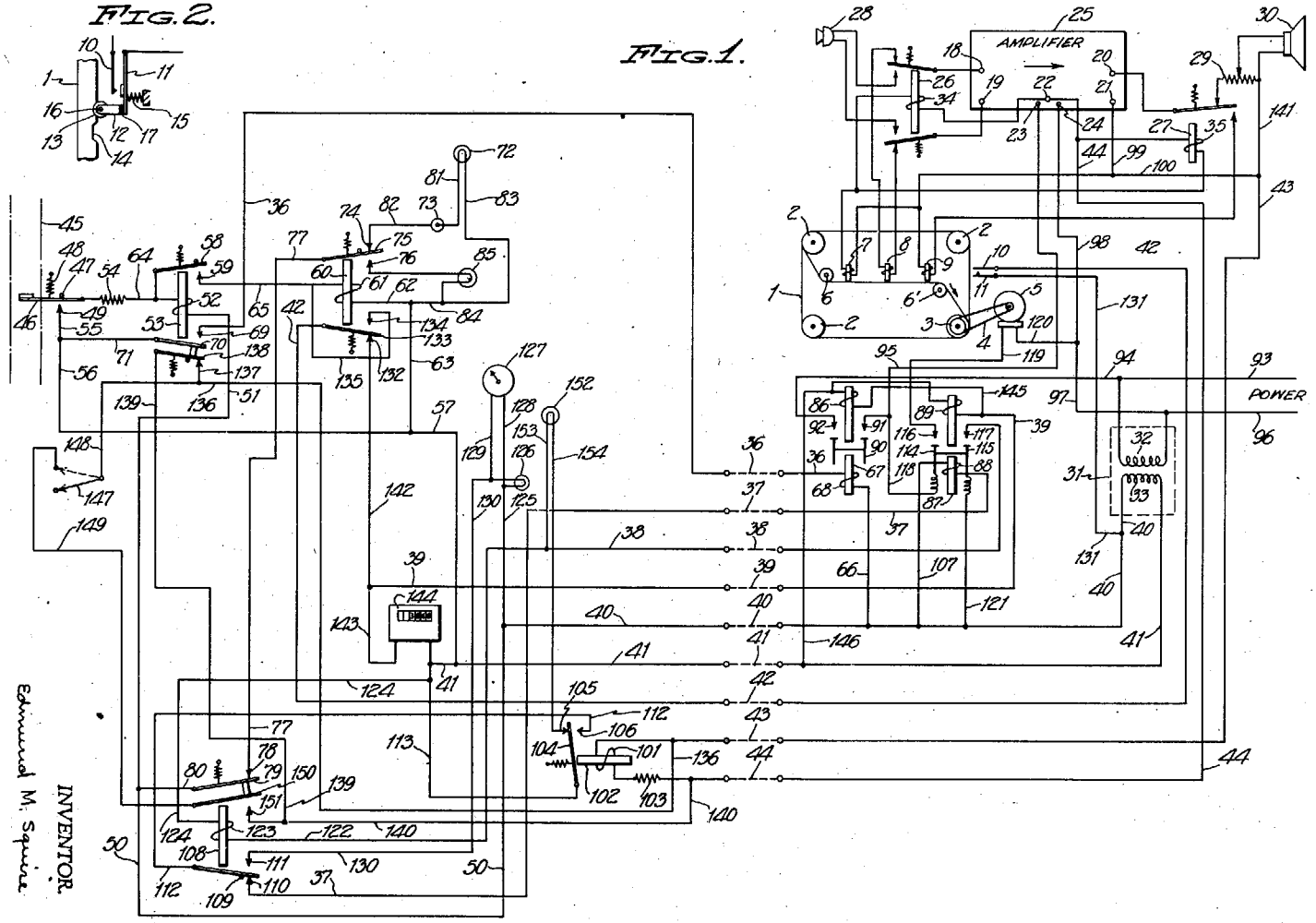
INVENTOR.
Edmund M. Squire
WITNESS:

Reissued May 10, 1949

Re. 23,112

UNITED STATES PATENT OFFICE 23,112

COIN-OPERATED VOICE RECORDING MACHINE

Edmund M. Squire, Radburn, N. J., assignor to The Brush Development Company, Cleveland, Ohio, a corporation of Ohio Original No. 2,379,548, dated July 3, 1945; Serial No. 433,911, March 9, 1942. Application for reissue June 28, 1946, Serial No. 679,971

7 Claims. (Cl. 179—100.2)

The object of my invention is to provide a suitable coin-operated mechanism for the control of a magnetic voice recording machine to the end that the machine may be located in a public place and serve as an amusement device, or as a device for rehearsing speech or music.

A further object of my invention is to provide means for delaying operation of the machine until the cathodes of the electronic tubes in the amplifier of the magnetic recording machine have reached their proper operating temperature, thus avoiding the cost of energizing the amplifier while the machine is idle.

A further object of my invention is to provide a control permitting the previous recording to be twice repeated, at the option of the user, so that a particularly pleasing recording may be repeated.

It is to be understood that magnetic tape recording devices are well known, and that the magnetic recording device itself is not a part of my invention.

I attain these objects by the electrical mechanism illustrated in the accompanying drawing, in which—

Figure 1 is a schematic circuit drawing of the entire machine;

Figure 2 is a detail showing the arrangement of electrical contacts which are controlled by the magnetic tape.

Similar numerals refer to similar parts throughout the several figures.

A thin steel tape 1 passes over three long rollers 2 and a fourth long driver roller 3. Roller 3 is driven by belt 4 which connects it to electric motor 5. Tape 1 is endless and is looped around the four long rollers 2 and 3 many times, crossing over at rollers 6 and 6'. When the machine is in operation the entire length of the tape 1 will pass under the magnetic heads 7, 8, and 9 and this will continue repeatedly as long as the motor 5 continues to drive roller 3.

Contacts 10 and 11 are disposed on the machine in any convenient manner and arranged to be controlled by a notch 14 in tape 1. This is best illustrated in Figure 2. A roller 13 is provided with a circumferential slot which engages and guides one edge of tape 1. Roller 13 is secured by pivot 16 in the yoke 12 which is secured to contact arm 11 by electrical insulating material 17. Roller 13 is held in yielding engagement with tape 1 by the action of compression spring 15. When notch 14 in tape 1 passes roller 13, the roller 13 is forced by spring 15 into notch 14 and contact arm 11 is forced into engagement with contact 10.

Amplifier 25 may be of any desired construction. It must be adapted to amplify currents within the frequency range of the human voice, and preferably the wider frequency range of musical instruments.

Amplifier 25 is provided with input terminals 18 and 19, and output terminals 20 and 21. Terminals 23 and 24 are for the alternating current power supply to the amplifier. Terminal 21 is grounded to the amplifier chassis and terminal 22 is internally connected to supply direct current from the rectifier within the amplifier for use as hereinafter described. To draw current from the internal rectifier, an external circuit is established between terminals 22 and 21.

In changing from recording to reproduction, the input and output circuits of amplifier 25 are switched substantially simultaneously by relays 26 and 27 respectively, whose operating windings 34 and 35 are connected in multiple. When energized, the coils of these relays are supplied with direct current by the internal rectifier of the amplifier in order to avoid electrostatic shielding problems with respect to the amplifier input circuit which would otherwise arise if the windings were energized by alternating current. Of course, suitably designed and shielded alternating current relays may be used if desired.

A microphone 28 is provided for recording on the magnetic tape. A loud speaker 30 is provided for reproducing the recorded sounds. The output level of loudspeaker 30 is adjustable by volume control 29.

In order to permit the use of low voltage insulation on as much of the control apparatus as possible and particularly to permit the use of low voltage wiring for conductors 36 to 44 inclusion, a transformer 31 is provided, having a primary winding 32 adapted for energization by the commercial alternating current supply, and a secondary winding 33 which delivers a low voltage, preferably about 24 volts, for the operation of the various portions of control apparatus.

It is to be noted that the two sections of Figure 1 connected by the dotted portions of conductors 35 to 44 inclusive comprise the magnetic tape machine in one part and the coin control apparatus in the other part. By the use of low voltage in this interconnecting wiring, these two portions may be separated by a convenient distance, which will permit the more bulky magnetic recording device to be placed in an inconspicuous location while the coin control mechanism is placed for convenient access by the public. In this case, microphone 28 and loudspeaker 30, together with volume control 29 should be located near the coin control apparatus.

A coin chute is disposed to receive coins which will deflect lever 46 in the course of their passage along chute 45. Lever 46 is normally held in yielding engagement with fixed stop pin 47 by retractile spring 48. When a coin drops in chute 45, contact lever 46 momentarily engages fixed contact 49, returning thereafter to its original position. When the contact 49 is engaged by contact lever 46, a circuit is established from transformer secondary winding 33, along conductors 40, 50, and 51, relay winding 52 of relay 53, resistor 54, contact arm 46, contact 49, conductors 55, 56, 57 and 41 back to the other side of transformer secondary winding 33. This energizes relay 53, causing it to operate. The resistance of resistor 54 is as low as possible, but high enough so that no injury would result to either contacts 46—49, or contacts 10—11, if transformer secondary winding 33 were short-circuited through these contacts, momentarily.

Operation of relay 52, closes a circuit from transformer secondary winding 33 along conductors 40, 50, 51, relay winding 52, contacts 58—59, conductor 65, winding 61 of relay 60, and conductors 62, 63, 57 and 41 back to the other side of transformer secondary winding 33. This would result in the operation of relay 60, except for the fact that coin contacts 46—49 are still closed and a substantial short circuit is maintained around relay winding 61 via conductor 65, contacts 58—59, conductor 64, resistor 54, coin contacts 46—49, and conductors 56, 63, and 62. The resistance value of resistor 54 should be sufficiently low so that there will not be sufficient voltage drop across it under the preceding conditions to cause operation of relay 60. As soon as coin contact 46 disengages contact 49, this short-circuit path will be opened, and relay 60 will operate in series with relay 53, the circuit being established from secondary winding 33 along conductors 40, 50, 51, winding 52, contacts 58—59, conductor 65, winding 61, and conductors 62, 63, 57 and 41 back to the other side of secondary winding 33. Under this condition, it will be noted that both relays 53 and 60 are now operated, and their respective armatures attracted.

When the machine is idle, lamp 72 is lighted intermittently in series with flasher button 73. This is designed to attract the attention of the public. Any other device such as a sign or an audible signal may be readily substituted for lamp 72, and flasher button 73. The circuit for lamp 72, which indicates the idle condition, is established from transformer winding 33, along conductors 40, 50, and 80, closed relay contacts 78—79, conductor 77, closed relay contacts 75—74, conductor 82, flasher button 73, and conductor 81. The circuit is completed along conductors 83, 84, 63, 57 and 41 back to the other side of winding 33. Opening of contacts 75—74 upon energization of relay 60, breaks this circuit and extinguishes the idle condition indicator lamp 72. It is apparent that the circuit previously traced will cause standby lamp 85 to be energized by closure of contacts 75—76, which accompanies the opening of contacts 75—74. The purpose of standby lamp 85, is to indicate that the machine is ready to function, as soon as the vacuum tube cathodes of amplifier 25 are heated and ready for operation.

When relay 53 is operated upon closure of coin contacts 46—49, it closes its contacts 69—70. This has the effect of establishing a circuit from transformer secondary winding 33 along conductors 40, 66, winding 68 of relay 67, conductor 35, relay contacts 69—70, conductors 71, 56, 57 and 41, back to the other side of winding 33. Relay 67 is of the mechanically latched type, being provided with a contact closing winding or operating winding 68 and a contact opening or tripping winding 86. An impulse to winding 68 will close the contacts and they will remain closed until winding 86 is energized. Relays of this type are well known, and it is not important to the operation of the circuit herein described what will occur if both windings should be energized simultaneously. It should be noted that winding 68 should be capable of intermittent energization without overheating, because as will appear later, this winding will be energized during the first passage of tape 1 past magnetic heads 7, 8, and 9, and will be deenergized during the second such passage. This is not true of winding 86, nor of windings 88 and 89 of relay 87, because these latter windings receive only momentary impulses.

Energization of winding 68 causes U-shaped contacts 90 to engage stationary contacts 91 and 92 establishing a circuit from power supply conductor 93, along conductor 94, closed contacts 92—90—91 and conductor 95 to power supply terminal 23 of amplifier 25. The other power supply terminal 24 of amplifier 25 is permanently connected to power supply conductor 96 by conductors 97 and 98. This causes energization of amplifier 25.

When the vacuum tube cathodes in amplifier 25 have become heated, a limited amount of direct current will be available at terminals 21 and 22 of said amplifier. The internal arrangements within the amplifier 25 are such that terminals 21 and 22 may be short circuited without injury to any of the apparatus, by provision of suitable current limiting resistors within the amplifier. The current strength is adequate to energize relays 34 and 35 and to energize the obliterating magnetic head 7. The potential appearing across terminals 21 and 22 when the amplifier has reached its operating condition is transmitted from terminal 21 along conductors 99, 100, and 43 to winding 101 of relay 102, and from terminal 22 along conductor 44 and through resistor 103 to the other side of relay winding 101. The operating characteristics of relay 102 and the value of resistance of resistor 103 are so adjusted that relay 102 will not operate until the cathodes of the vacuum tubes within amplifier 25 have reached their proper operating temperature, and it is also so adjusted with respect to relays 26 and 27 so that it operates substantially simultaneously therewith.

Upon operation of relay 102, it breaks contacts 105 and 104 and closes contacts 104 and 106. This establishes a circuit from transformer secondary winding 33 along conductors 40 and 107, winding 88 of relay 87, conductor 37, closed contacts 110—109 of relay 108, conductor 112, closed contacts 104—106 of relay 102, conductor 113, and conductor 41 back to the other side of transformer secondary winding 33. This circuit energizes relay winding 88, and relay 87 latches in its operated position closing its contacts 114—116 and 115—117.

Closure of contacts 114—116 establishes a circuit from power conductor 93 along conductor 94, through closed contacts 92—90—91 of relay 67, conductor 118, closed relay contacts 114—116, and conductor 119 to motor 5. The other terminal of motor 5 is permanently connected to the other side of the power supply via conductors 120, 97, and 96. This causes motor 5 to operate, driving roller 3 and carrying endless magnetic recording tape 1 around and over the other rollers. Thus, it will be seen that tape 1 does not move until amplifier 25 is ready for operation, and that thereafter tape 1 passes at substantially constant speed under the magnetic heads 7, 8, and 9.

Upon the operation of relay 87, contacts 115—117 were also closed. This established a circuit from transformer secondary winding 33, along conductors 40 and 121, closed relay contacts 115—117, conductors 33 and 122, winding 123 of relay 108, conductor 124, and conductor 41 back to the other side of transformer secondary winding 33. This operated relay 108, breaking the circuit of contacts 109—110 and closing the circuit of contacts 109—111.

A circuit is now established from transformer secondary winding 33, along conductors 40 and 125 to indicating lamp 126 and continuing along conductor 128 to electric time indicator 127. The circuit is completed via conductors 129, 130, closed relay contacts 111—109, conductor 112, closed relay contacts 106—104, conductor 113, and conductor 41 to the other side of transformer secondary winding 33. Time indicator 127 is an electric clock mechanism of the self starting type, having its period for one revolution corresponding approximately to the time required for tape 1 to travel once though the recording machine. The machine is now in condition to receive and record speech or music. Relays 26 and 27 are energized connecting input terminals 18 and 19 of amplifier 25 to microphone 28 and the output terminal 20 to recording magnetic head 9. As tape 1 passes under head 9, the variations in magnetic strength will be retained and will influence reproducing head 8 at a later time during reproduction. Obliterating head 7 is energized with steady direct current and removes from tape 1 any remnant magnetic influences remaining from the previous recording before the new recording is impressed upon the tape by recording head 9. Indicating lamp 126 informs the user of the machine that the machine is in condition for recording and time indicator 127 permits the user to adjust his recording interval to terminate at the end of the recording cycle.

After the tape 1 has traveled substantially once through the machine, notch 14 in tape 1 passes under roller 13 causing a momentary closure of contacts 11 and 10. At the instant of closure, a circuit is established from transformer secondary winding 33, along conductors 40 and 131, tape contacts 11—10, conductor 42, closed contacts 133—134 of relay 60, conductors 135 and 65, closed contacts 58—59 of relay 53 and its winding 52, and conductors 51, 50 back to conductor 40 again, short circuiting relay winding 52 and thereby releasing relay 53. Relay 60 is held operated by the following circuit: starting from transformer secondary winding 33, conductors 40 and 131, tape contacts 11—10 conductor 42, closed contacts 133—134 of relay 60, conductor 135, winding 61, and conductors 62, 63, 57 and 41 to the other side of transformer secondary winding 33. Because the circuit just traced includes tape contacts 11—10, it will open when contacts 11—10 open and release relay 60. Relays 53 and 60 are now both released and in condition to be re-operated by coin contacts 46 and 49. No provision is included for storing coin impulses but mechanism to perform this function may be readily added if desired.

Upon the release of relay 53, a circuit is established from ground terminal 21 of amplifier 25 along conductors 99, 100, 43, 136, closed relay contacts 137—138, and conductors 139, 140, and 44 back to the direct current supply terminal 22 of amplifier 25. This short circuits the direct current supply, releasing relays 26 and 27 and deenergized obliterating heat 7. Reproducing head 8 is now connected to amplifier input terminals 18 and 19. Output terminal 20 is connected to volume control 29 and loudspeaker 30, the other side of the output circuit being ground terminal 21, which is permanently connected via conductors 99, 100 and 141. The tape 1 now imparts to magnetic reproducing head 8 the impulses which it previously received from recording head 9, and the reproduced sounds issue from loudspeaker 30 after amplification by amplifier 25. By provision of suitable equalizers, a single magnetic head may be used for both recording and reproduction, but separate heads have been indicated for the purpose of simplifying the showing of the recording machine.

Tape 1 will continue again through the machine and after substantially all of the previously recorded sounds have been reproduced, notch 14 in tape 1 will again pass under roller 13, and contacts 10 and 11 will again momentarily engage each other. This will send an impulse from transformer secondary winding 33 along conductors 40, 131, tape contacts 10—11, conductor 42, closed relay contacts 133—132 of relay 60, and conductors 142, 39 and 145 to tripping or releasing windings 89 and 86 of relays 87 and 67 respectively. The impulse also is carried via conductor 143 to electromagnetic counter 144. This registers one count on counter 144 and trips relays 87 and 67 into their normal or released condition, deenergizing amplifier 25 and motor 5 and opening the circuit of coil 123 of relay 108. The other side of transformer winding 33 is connected to tripping windings 86 and 89 via conductors 41 and 146, and to counter 144 via conductor 41. This stops the machine and it is then ready to be used again.

A switch 147 is provided to obtain a reproduction of the sounds recorded without making a new recording, by eliminating the recording period from the cycle. When closed, and when the machine is operating so that relay winding 123 of relay 108 is energized, the switch 147 will short-circuit direct current supply terminals 21 and 22 of amplifier 25 via conductors 44, 140, closed relay contacts 151—150 of relay 108, conductor 149, switch 147 and conductors 148, 136, 43, 100, and 99.

Whenever terminals 22 and 21 are short-circuited, the recording machine is in the reproducing condition because no energy is available for obliterating head 7 or for relays 26 and 27. In addition, relay 102 is deenergized, closing contacts 104 and 105 and lighting reproducing indicating light 152 through a circuit starting at transformer secondary winding 33, conductors 40, 121, closed contacts 115—117 of relay 87, conductors 30 and 153, lamp 152, conductors 154, closed contacts 105—104 of relay 102, and conductors 113 and 41 to the other side of transformer secondary winding 33. Switch 147 does not interfere with starting of the machine, because relay 108 is released except while the machine is running and does not connect switch 147 until relay 102 has already performed its starting function.

As has been described, upon dropping a coin, a person may make a recording and hear it played back once. If he so desires, he may close switch 147, and by dropping another coin, hear the same recording repeated twice. There is a delay after each dropping of a coin, until the amplifier is ready for operation. This waiting period is indicated by the "standby" pilot lamp, and as soon as the machine is running, either the recording lamp, or the reproducing lamp will be lighted, depending upon the position of switch 147 during the first half of the cycle, and the reproducing lamp will always be lighted during the second half of the cycle. Although the specific apparatus above described utilizes a notch in the magnetic tape, it is to be understood that suitable timing mechanism or other automatic means responsive to operation of the machine may be utilized to practice the invention.

I claim:

1. In a recording and reproducing machine having a record structure forming an endless flexible magnetic recording medium and including a control element, manual starting means, and control means including means operable by said control element and responsive to each passage of said medium through said machine, whereby the completion of the first passage of said medium will condition said machine for reproducing and the completion of the second such passage will automatically stop said machine.

2. In a magnetic recording device, comprising and endless flexible magnetic recording medium, manual operation initiating means, automatic means responsive to said operation initiating means and to successive passages of said recording medium through said machine, and additional manually controlled means, whereby after initiation of operation by said first named manual means recording or reproduction is under control of said second manually controlled means, and after the first passage of said medium through said machine, reproduction will be provided regardless of the condition of said second manually controlled means, and after the second such passage the machine will automatically stop.

3. In a recording and reproducing machine, a record structure providing an endless elongated magnetizable and demagnetizable recording medium and including a control element, means operable to initiate the running of said recording medium, control means including means operable by said control element and switching means operative during said running and adapted to condition said machine for recording during the first passage through said machine of said recording medium, said control means operating to condition said machine for reproducing after said first passage of said recording medium and to stop said running at or about the completion of the second passage of said recording medium through said machine.

4. In a recording and reproducing machine having a record structure forming an endless flexible magnetic recording medium and including a control element, starting means, and control means including means operable by said control element and responsive to each passage of said medium through said machine, whereby the completion of the first passage of said medium will condition said machine for reproducing and the completion of the second such passage will stop said machine.

5. In a recording and reproducing machine, a record structure providing an endless elongated magnetizable and demagnetizable recording medium including a control element, means operable to initiate the running of said recording medium, control means including means operable by said control element and switching means operative during said running and adapted to condition said machine for recording during the first passage through said machine of said recording medium, said control means operating to condition said machine for reproducing after said first passage of said recording medium, said control means including means responsive to the substantial completion of the second passage of said recording medium through said machine and disposed to terminate said running of said recording medium.

6. In a recording and reproducing apparatus for magnetically transducing record signals, such as recording magnetic signals or reproducing the magnetically recorded signals, a record structure providing a cyclically operative magnetizable recording medium and including a control element, record transducing means for carrying on record transducing operations while said recording medium moves past said transducing means, guide means including impelling means for guiding and impelling said recording medium past said transducing means during a predetermined number of passage cycles of a substantially complete passage of the recording medium past said transducing means, and in combination therewith control means including means operable by said control element for causing said apparatus to perform with said recording medium record transducing operations during a predetermined number of passage cycles and to thereafter stop the motion of said recording medium, said control means including means for causing said apparatus to perform at least one signal recording operation during at least a part of one passage cycle of said recording medium.

7. In a recording and reproducing apparatus for magnetically transducing record signals, such as recording magnetic signals or reproducing the magnetically recorded signals, a record structure providing an endlessly operative magnetizable recording medium and including a control element, record transducing means for carrying on record transducing operations while said recording medium moves past said transducing means, guide means including impelling means for guiding and impelling said recording medium past said transducing means during a predetermined number of passage cycles of a substantially complete passage of the recording medium past said transducing means, and in combination therewith control means including means operable by said control element for causing said apparatus to perform with said recording medium record transducing operations during a predetermined number of passage cycles and to thereafter stop the motion of said recording medium, said control means including means for causing said apparatus to perform at least one signal recording operation during one passage cycle of said recording medium.

EDMUND M. SQUIRE.

REFERENCES CITED

The following references are of record in the file of this patent:

UNITED STATES PATENTS

| Number | Name | Date |
|---|---|---|
| 873,083 | Poulsen et al. | Dec. 10, 1907 |
| 1,166,925 | Ober | Jan. 4, 1916 |
| 1,853,960 | Cunningham | Apr. 12, 1932 |
| 2,002,352 | Owens | May 21, 1935 |
| 2,079,959 | Fear | May 11, 1937 |
| 2,385,701 | Halstead | Sept. 25, 1945 |

FOREIGN PATENTS

| Country | Date |
|---|---|
| Netherlands | Aug. 15, 1934 |